United States Patent [19]
Kondo

[11] 3,978,497
[45] Aug. 31, 1976

[54] PHOTOGRAPHIC CAMERA WITH AUTOMATICALLY CONTROLLED FILTER

[75] Inventor: Toshihiro Kondo, Chofu, Japan

[73] Assignees: Fuji Photo Film Co., Ltd., Minami-ashigara; Toshihiro Kondo, Tokyo, both of Japan

[22] Filed: May 19, 1975

[21] Appl. No.: 578,948

[30] Foreign Application Priority Data
May 20, 1974   Japan................................ 49-55392

[52] U.S. Cl................................. 354/43; 352/141; 354/152; 354/271
[51] Int. Cl.² .................... G03B 7/08; G03B 9/00
[58] Field of Search .................. 354/22, 23, 26, 30, 354/43, 44, 45, 59, 152, 228, 270, 271, 354; 352/141

[56] References Cited
UNITED STATES PATENTS

| | | | |
|---|---|---|---|
| 3,209,667 | 10/1965 | Coutant | 352/141 X |
| 3,538,335 | 11/1970 | Tartanian | 352/141 X |
| 3,732,793 | 5/1973 | Tague | 354/354 |

*Primary Examiner*—Joseph F. Peters, Jr.
*Attorney, Agent, or Firm*—Gerald J. Ferguson, Jr.; Joseph J. Baker

[57] ABSTRACT

An optical filter the density of which is variable is provided in the optical path of the taking lens. The density of the filter is controlled to effect optimum exposure with freely selected aperture size and the shutter speed by means of an exposure control circuit. The density of the filter is varied by moving a filter operating member which is driven by a filter driving means. The start and stop of the filter operating member is controlled by a start controlling electromagnet and a stop controlling electromagnet which are controlled by an electric circuit connected with a light measuring circuit including a photodetector to measure the scene brightness.

8 Claims, 13 Drawing Figures

PHOTOGRAPHIC CAMERA WITH AUTOMATICALLY CONTROLLED FILTER

BACKGROUND OF THE INVENTION

1. Field of the Invention

This invention relates to an automatic exposure control camera, and more particularly to a photographic camera with an exposure control means wherein the aperture size of a diaphragm and the shutter speed are freely selected and the density of a filter is automatically controlled in accordance with the scene brightness.

2. Description of the Prior Art

In the conventional automatic exposure control cameras, either the aperture size of a diaphragm or the shutter speed is freely selected in advance and the other is automatically controlled by use of an exposure control circuit. In addition to this ordinary type of the automatic exposure control camera, it has also been known in the art that a combination of the aperture size and the shutter speed is automatically selected from a group of predetermined combinations thereof in accordance with the scene brightness measured by use of an exposure measuring circuit and an exposure control circuit connected therewith. In these conventional automatic exposure control cameras, only two variables, i.e. the aperture size and the shutter speed, are used to determine the exposure. The film sensitivity is of course introduced into the exposure control means as input information to determine the exposure. Therefore, if one of the two variables is preselected, the other is automatically determined by the exposure control means.

However, in the photographic technique, the aperture size has an important role beside the exposure control to determine the focal depth. Further, the shutter speed has also an important role beside the exposure control to determine the degree of blur. Therefore, it is desirable to freely select both the aperture size and the shutter speed to obtain a photograph of desirable sharpness and blur. As described hereinabove, in the conventional photographic cameras with an exposure control means, it has been impossible to freely select both the aperture size and the shutter speed.

SUMMARY OF THE INVENTION

In view of the above description and observations of the conventional photographic cameras with an exposure control means, it is the primary object of the present invention to provide a photographic camera with an exposure control means in which both the aperture size and the shutter speed can freely be selected.

Another object of the present invention is to provide a photographic camera having a density-variable optical filter which is controlled to vary its density in accordance with the scene brightness to obtain photographs of optimum exposure by use of an exposure control means.

Still another object of the present invention is to provide a photographic camera having a density-variable optical filter comprising a pair of polarization filters one of which is rotated with respect to the other to vary the density or the transmittivity thereof by an exposure control means.

A further object of the present invention is to provide a photographic camera having a density-variable optical filter the density of which is automatically controlled by means of an exposure control means in which the density of the filter is varied by moving a mechanical movable member in the camera, the start and stop of the movable member is controlled by an electric circuit employing a pair of electromagnets.

A still further object of the present invention is to provide a photographic camera having a density-variable optical filter the density of which is automatically controlled by means of an exposure control means in which a mechanical movable member to vary the density of the filter is moved by an electromagnetic force and competely controlled by use of an electric circuit.

The above objects are accomplished by providing an optical filter in the optical path of the taking lens the optical density or transmittivity of which is automatically varied by means of an exposure control means including a light measuring circuit in which two factors of the aperture size of a diaphragm and the shutter speed are taken into account.

In the photographic camera in accordance with the present invention, a filter operating member which is moved to vary the density of the density-variable optical filter is controlled of its start and stop of movement by use of a start controlling electromagnet and a stop controlling electromagnet, wherein the time interval between the energization of the two electromagnets is controlled by an electric circuit connected with a light measuring circuit.

In order to drive said filter operating member to vary the density of an optical filter, a filter driving means is used. As the filter driving means, any kind of driving means can be employed such as a spring, an electric motor, a combination of a permanent magnet and an electromagnetic coil, and gas pressure.

As the density-variable optical filter, various kinds of optical filter the density or transmittivity of which can be varied such as a pair of polarization filters one of which is rotatable with respect to the other, a pair of optical pattern plates one of which is rotated or moved with respect to the other to vary or change the total amount of light passing therethrough (which will hereinafter be described in detail), and a liquid density filter the thickness of which can be varied to vary the transmittivity thereof. All these filters the density or light transmittivity of which is variable will hereinafter referred to as "density-variable optical filter" or simply as "variable filter".

As will be understood from the above description of the filter driving means and the density-variable optical filter, the present invention can be embodied in a variety of combinations thereof.

In the present invention, it should be noted that the sensitivity of the film used must be considerably high in comparison with that of the film used in the conventional photographic cameras, since the quantity of incident light is attenuated by the variable filter. In practical use, the sensitivity of the film used in this invention should preferably be over ASA3000. As an example of such a high-sensitivity film which is commercially available, is known "TYPE 410" made by Polaroid Corporation the sensitivity of which is ASA10000.

DESCRIPTION OF THE PREFERRED EMBODIMENTS

A first embodiment of the present invention in which a spring is used for driving a filter operating member and a pair of polarization filters are used as the variable filter will hereinbelow be described in detail referring to FIGS. 1 to 3.

Figure 1:
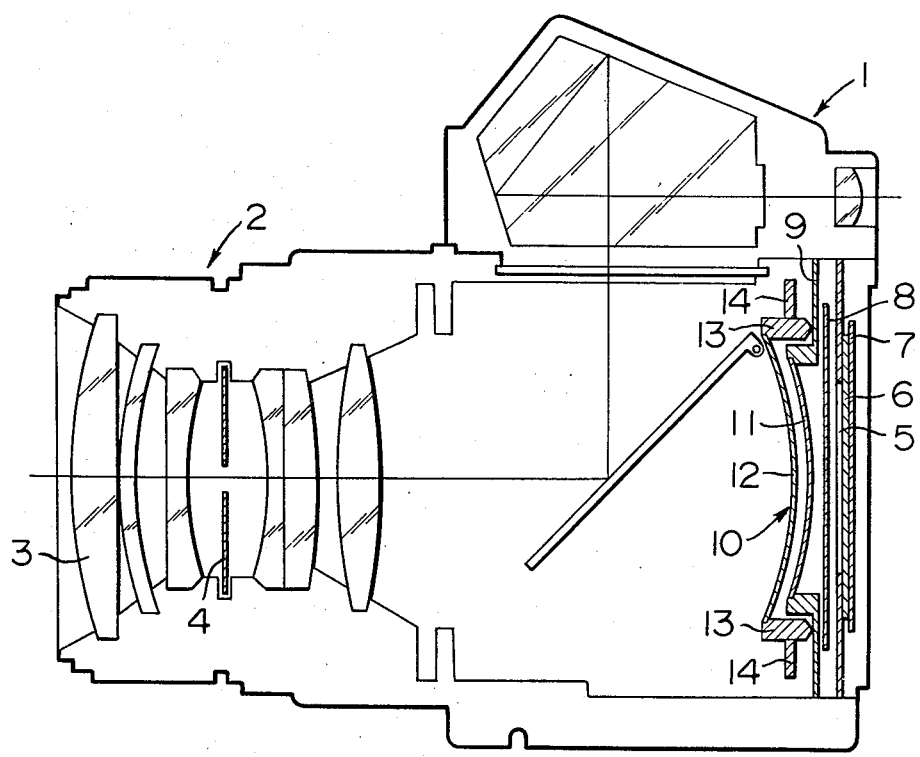
FIG. 1 is a schematic longitudinal sectional view of a photographic camera provided with a density-variable optical filter comprising a pair of polarization filters in accordance with an embodiment of the present invention.

FIG. 1 illustrates a single lens reflex camera in which the present invention is embodied. A camera body 1 is provided with a lens barrel 2 on the front face thereof. The lens barrel 2 is provided with a taking lens system 3 and a diaphragm 4. In the back of the camera body 1 is provided an aperture plate 5 on the back of which is pressed a film 6 by a film pressure plate 7. In front of the aperture plate 5 is provided a focal plane shutter 8. In front of the focal plane shutter 8 is provided a fixed plate 9 to which a variable filter 10 is mounted. The variable filter 10 is comprised of a fixed polarization filter 11 fixed to the plate 9 and a rotatable polarization filter 12 fixed to a rotatable ring 13. The rotatable ring 13 rotates about the optical axis of the taking lens 3 and supports the rotatable polarization filter 12 in parallel to the fixed polarization filter 11. The ring 13 is provided with a flange 14 on the outer periphery thereof which flange 14 is provided on the periphery thereof teeth 14a as shown in FIG. 2.

Figure 2:
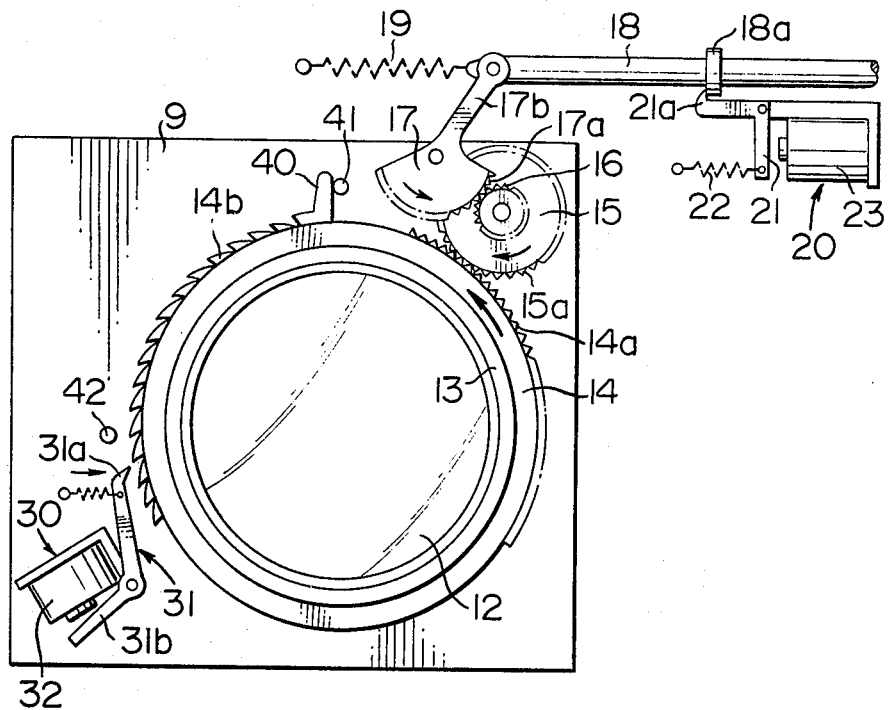
FIG. 2 is a front view showing a filter operating mechanism employed in the first embodiment of the present invention in which polarization filters are employed.
Figure 3:
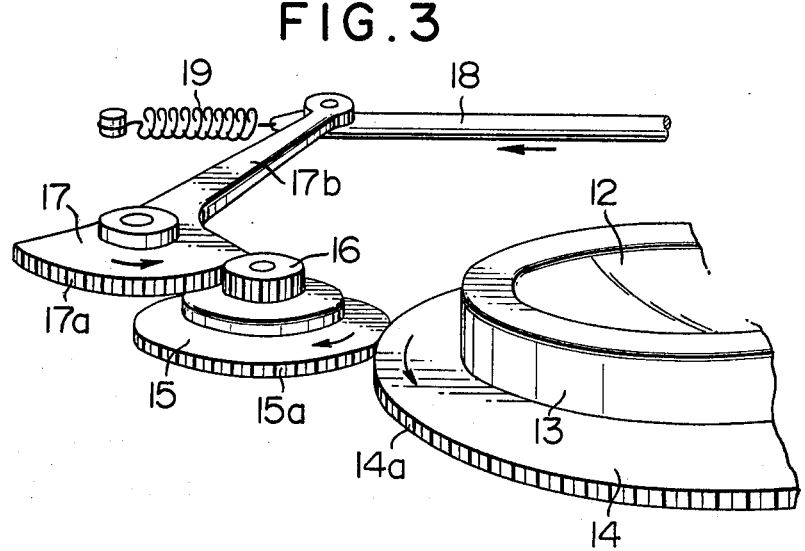
FIG. 3 is a fragmentary perspective view showing a part thereof.

Referring to FIG. 2, the teeth 14a are meshed with teeth 15a of a spur gear 15 rotatably mounted on said fixed plate 9. The spur gear 15 has a concentrically mounted pinion 16 which is in turn meshed with teeth 17a of a sector gear 17 rotatably mounted on the fixed plate 9. The sector gear 17 has a lever 17b at one end thereof which lever is pivotally connected with a filter setting rod 18. The filter setting rod 18 is connected with a tension spring 19 at an end thereof so that the rod 18 may be pulled leftward in FIG. 2 by the tension thereof. The filter setting rod 18 is provided with a flange 18a which is brought into engagement with a hook 21a of a locking lever 21 when the rod 18 is slid to the right. The locking lever 21 is pivotally oriented and spring-urged clockwise by a tension spring 22. An electromagnet 23 is provided to make the locking lever 21 rotate counterclockwise so that the hook 21a thereof may be disengaged from the flange 18a of the rod 18. When the shutter is charged and the film is wound up, the filter setting rod 18 is slid to the right overcoming the tension of the spring 19 and the flange 18a is brought into engagement with the hook 21a of the locking lever 21 and held in the right position thereby. The locking lever 21 and the electromagnet 23 constitute a locking means 20. When the shutter is released, or exactly immediately before the shutter release, the locking means 20 releases the filter setting rod 18. Upon receipt of a shutter release signal, the electromagnet 23 is energized to disengage the hook 21a from the flange 18a of the rod 18 and let the rod 18 slide to the left by the tension of the spring 19. By the leftward movement of the filter setting rod 18, the sector gear 17 is rotated counterclockwise and the spur gear 15 is rotated clockwise and accordingly the rotatable ring 13 is rotated counterclockwise.

In the preparation state where the filter setting rod 18 is in its right most position as shown in FIG. 2, the rotatable polarization filter 12 is in the position to make the transmittivity of the polarization filter combination composed of the fixed filter 11 and the rotatable filter 12 the lowest. when the rotatable filter 12 is rotated by 90° from said position, the transmittivity of the polarization filter combination 11 and 12 becomes the highest. As is well known in the art, the transmittivity of the polarization filter combination 11 and 12 can be varied by rotating the rotatable polarization filter 12 with respect to the fixed polarization filter 11. By stopping the rotation of the rotatable ring 13 on the way of rotation thereof, an intermediate value of transmittivity can be obtained.

Said flange 14 fixed to the rotatable ring 13 is further provided on the periphery thereof with stopper teeth 14b. A stopper means 30 comprising an electromagnet 32 and a stopper lever 31 having a stopper tip 31a operated by the electromagnet 32 is provided in the vicinity of the teeth 14b of the rotatable ring 13. The stopper lever 31 is spring-urged in a direction to be disengaged from the teeth and moved to an engaging position by said electromagnet 32. The stopper lever 31 is substantially L-shaped and one arm thereof has said stopper tip 31a at the end thereof and the other arm thereof 31b is attracted by the electromagnet 32 to make the stopper tip 31a engaged with one of said teeth 14b.

The rotatable ring 13 has a radially extending projection 40 which is stopped by a pair of pins 41 and 42 fixed to the plate 9 to limit the rotation of the ring 13. One pin 41 is to limit the rotation of the ring 13 when the filter is set, and the other pin 42 is to stop the ring 13 at a position of the maximum transmittivity.

In operation of the above described first embodiment of the invention, the filter setting rod 18 is moved to the right when the film is wound up and the flange 18a thereof is brought into engagement with the hook 21a of the locking lever and the rod 18 is held by the locking means 20 in its right position where the projection 40 abuts on the stopper 41. At this moment, the stopper tip 31a of the stopper lever 31 is disengaged from the teeth 14b. When the shutter is released, the electromagnet 23 of the locking means 20 is energized to disengage the hook 21a of the locking lever 21 from the flange 18a of the filter setting rod 18 and the rod 18 is moved to the left by the tension of the tension spring 19. By the leftward movement of the filter setting rod 18, the sector gear 17 is rotated counterclockwise and the rotatable ring 13 holding the rotatable polarization filter 12 is rotated counterclockwise by way of the pinion 16 and the spur gear 15. By the counterclockwise rotation of the rotatable polarization filter 12, the light transmittivity of the polarization filter combination 11 and 12 is increased.

On the way of the counterclockwise rotation of the rotatable polarization filter 12, said electromagnet 32 of the stopper means 30 is energized and the stopper tip 31a of the stopper lever 31 is brought into engagement with one of the stopper teeth 14b and makes the ring 13 stop at a position where the density or transmittivity of the variable filter 10 is determined by the angle of rotation. The angle of rotation of the rotatable filter 12 is determined by the time interval between the energization of the first electromagnet 23 and that of the second electromagnet 32, since the rotation of the rotatable ring 13 is initiated by the energization of the first electromagnet 23 and the stopped by the energization of the second electromagnet 32. The speed of rotation of the rotatable ring 13 is predetermined by the tension of the spring 19. In this embodiment, the longer the time interval, the higher the transmittivity of the variable filter 10.

Figure 4:
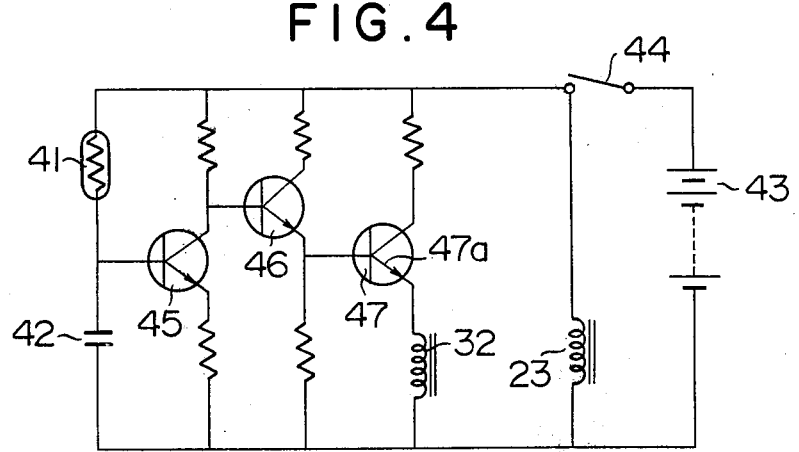
FIG. 4 is a circuit view showing an example of an electric circuit employed in the present invention for operating a filter controlling means in accordance with the scene brightness measured by a photodetector employed therein.

In order to energize two electromagnets 23 and 32 with the time interval corresponding to the scene brightness, a time constant circuit including a light measuring circuit as shown in FIG. 4 is used for example. Referring to FIG. 4, a photodetector 41 such as a cadmium sulfide element to receive light from the object to be photographed and a capacitor 42 are connected in series with a power source 43 by way of a switch 44. By the combination of the photodetector 41 serving as a variable resistor the resistance of which corresponds to the scene brightness and the capacitor 42, a time constant corresponding to the scene brightness is obtained. Said electromagnet 23 of the locking means 20 to start the filter is connected in parallel with the time constant circuit 41 and 42 across the power source 43. Three transistors 45, 46 and 47 are connected in three steps to amplify the output from the time constant circuit 41 and 42. Said electromagnet 32 of the stopper means 30 to stop the filter is connected with the emitter 47a of the third transistor 47. The third transistor 47 acts as a switching element to energize the electromagnet 32.

In operation of the above described electric circuit as shown in FIG. 4, the switch 44 is closed immediately before the shutter is released to energize the electromagnet 23 which starts the filter setting rod 18 and makes the rotatable polarization filter 12 rotate. Simultaneously with the start of the rotatable filter 12, the time constant circuit starts its operation. When the time corresponding to the scene brightness has lapsed, the transistor 47 operates to energize the electromagnet 32 connected with the emitter 47 thereof and makes the stopper means 30 stop the rotation of the polarization filter 12. The lower is the brightness of the scene or the object to be photographed measured by the time constant circuit 41 and 42, the longer becomes the time between the closure of the switch 44 that is the energization of the electromagnet 23 and the energization of the electromagnet 32 and accordingly the higher becomes the light transmittivity of the variable filter 10. After the rotatable filter 12 is stopped, that is after the density or transmittivity of the variable filter 10 has been determined, the shutter is released to obtain a photograph of optimum exposure. After the shutter is released, the switch 44 is opened and the electromagnets 23 and 32 are deenergized to return the levers 21 and 31 to their initial position.

Although in the above described first embodiment of the invention a sping 19 is used as the filter driving means, various other means can be replaced therefor as mentioned before. For instance, said lever 17b of the sector gear 17 may be connected with a plunger or the like which is driven by electromagnetic force or the sector gear 17 may be mounted to a shaft of a motor. The rotatable ring 13 can be directly rotated by electromagnetic force or the like, one example of which will hereinafter be described in detail in the third embodiment.

In any type of the filter driving means, the start and the stop of the rotation of the rotatable filter are controlled by use of two electromagnets which are operated by an electric circuit as described above and shown in FIG. 4. The mechanical interlocking means for transmitting the driving force of the driving means to the rotatable filter operating member may be of any type which is obvious to those skilled in the art.

On the other hand, as the variable filter used for varying the light transmittivity through the taking lens system, a pair of pattern plates each being composed of light transmitting parts and light intercepting parts the light transmittivity through which pair is varied by moving or rotating one of the pair with respect to the other can be employed. Or a continuously density changing optical density filter can be employed as the variable filter. For instance, a photographic film on which several steps of density patterns are recorded can be used as the variable filter by selectively bringing one of the patterns into alignment with the optical axis of the taking lens. The density patterns may be recorded in infinite steps, i.e. continuously, so that the light transmittivity may continuously change by moving the film in the direction perpendicular to the optical axis. Alternatively, several ND filters of different density can be used as the variable filter by mounting the several ND filters of different density to a filter turret which is rotatable about its center and selecting one of the filters by rotating the turret. In every case, the movement or rotation of the film or turret is controlled by the exposure control means including two electromagnets in the same way as that employed in the aforementioned embodiment.

Figure 5A:
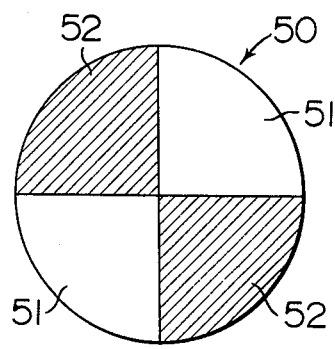
FIGS. 5A and 5B are front views showing an example of optical pattern plates serving as a variable filter employed in this invention.
Figure 5B:
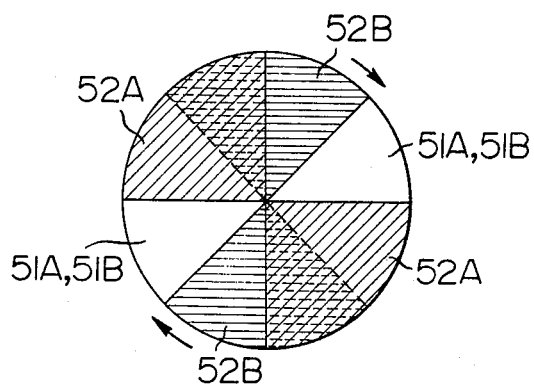

Several examples of the pattern plates which constitute by a pair thereof the variable filter will be described in detail referring to FIGS. 5A, 5B and 6A to 6C. FIGS. 5A and 5B show a basic example of the pattern plate. A pattern plate 50 as shown in FIG. 5A has transparent parts 51 and opaque parts 52. Two of the pattern plates 50 are superposed and located in the vicinity of the diaphragm of the camera and one of the plates 51A is rotated with respect to the other 51B as shown in FIG. 5B. When the pattern of one plate 51A is completely aligned with the pattern of the other plate 51B, the transmittivity of the superposed plates 51A and 51B is the maximum. As one plate 51A rotates with respect to the other, the transmittivity is lowered. FIG.

Figure 6A:
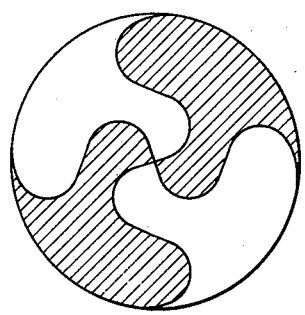
FIGS. 6A to 6C are front views showing other examples of the optical pattern plates.
Figure 6B:
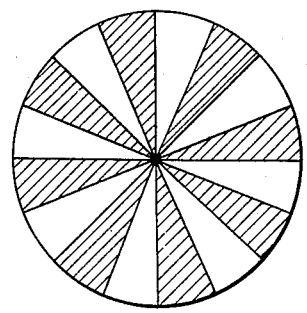
Figure 6C:
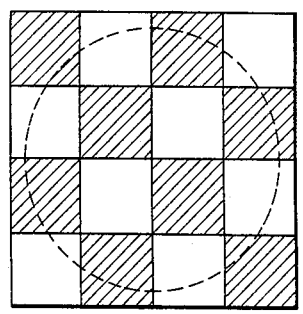

5B show the state where one plate 51A is rotated at 45° with respect to the other plate 51B and the transmittivity of the pair of plates 50 is lowered to a half of that in the state as shown in FIG. 5A. FIGS. 6A to 6C show other examples of the pattern which can be employed for the pattern plate used in this invention as the variable filter. The pattern shown in FIG. 6C is for a pattern plate which is not rotated but linearly slid with respect to the other to vary the transmittivity.

A second embodiment of the present invention in which the pattern plates are employed as the variable filter will hereinbelow described with reference to FIG. 7. In this embodiment, a plunger is used for driving the filter.

Figure 7:
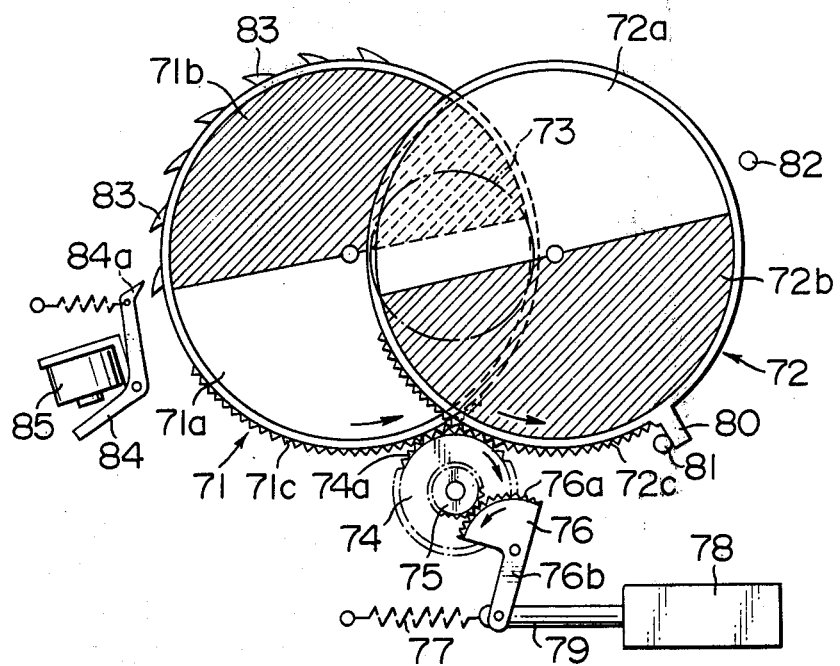
FIG. 7 is a front view showing a filter operating mechanism employed in the second embodiment of the present invention in which a pair of pattern plates are employed.

Referring to FIG. 7, a pair of pattern plates 71 and 72 each having a semicircular transparent part 71a, 72a and a semicircular opaque part 71b, 72b are partially overlapped with each other at the aperture 73 of the taking lens of a camera. The pattern plates 71 and 72 are both rotatable to vary the transmittivity of light of the overlapped portion thereof. As the both plates 71 and 72 rotate clockwise, the transmittivity of the overlapped portion thereof is lowered and vice versa. The plates 71 and 72 are provided with teeth 71c and 72c on the periphery thereof which are meshed with teeth 74a of a single spur gear 74. The spur gear 74 has a concentric pinion 75 mounted thereon which is in turn meshed with teeth 76a of a sector gear 76. The sector gear 76 has an arm 76b which is connected with a plunger 79 of a solenoid 78 and is spring-urged to the left by a tension spring 77. The solenoid 78 is operated to move the plunger to the right. One pattern plate 72 is provided on the periphery thereof a projection 80 which is to abut on a pair of stoppers 81 and 82 so that the rotation of the pattern plates 71 and 72 may be limited thereby. The other pattern plate 71 is provided on the periphery thereof several teeth 83. A stopper lever 84 having a stopper tip 84a to be engaged with the teeth 83 is provided by the pattern plate 71 and an electromagnet 85 is provided to operate the stopper lever 84.

Said solenoid 78 is operated to start the rotation of the pattern plates 71 and 72 and said electromagnet 85 is operated to stop the rotation thereof. Therefore, by controlling the solenoid 78 and the electromagnet 85 in the similar way to that employed in said first embodiment to control said two electromagnets 23 and 32 as shown in FIG. 4, the transmittivity of the pattern plates 71 and 72 can be controlled to obtain the optimum exposure in accordance with the scene brightness.

Figure 9:
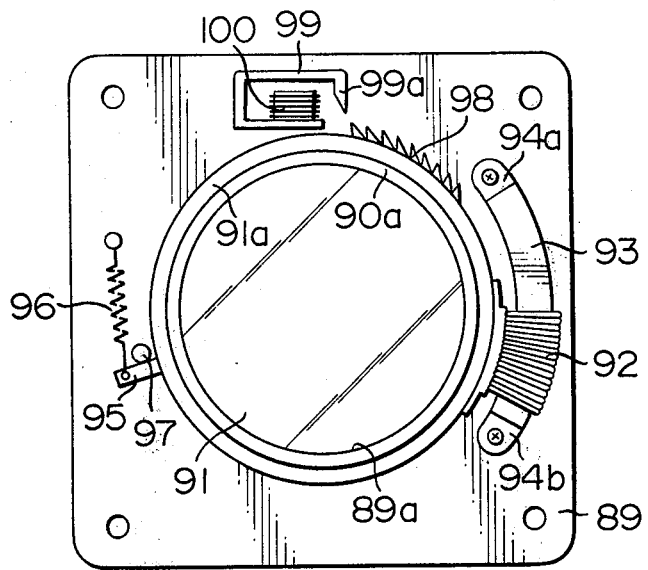
FIG. 9 is a front view showing a filter operating means employed in the third embodiment of the present invention.
Figure 10:
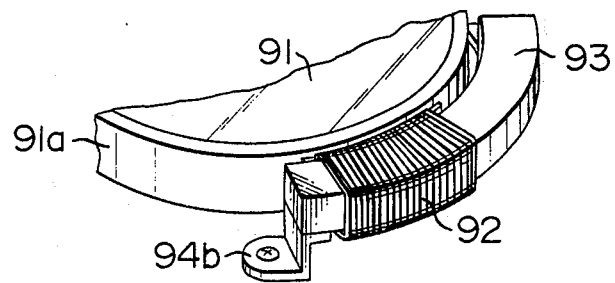
FIG. 10 is a fragmentary perspective view showing a part thereof.

A third embodiment in which a rotatable polarization filter is rotated with respect to a fixed polarization filter by electromagnetic force will hereinbelow be described in detail with reference to FIGS. 8 to 10.

Figure 8:
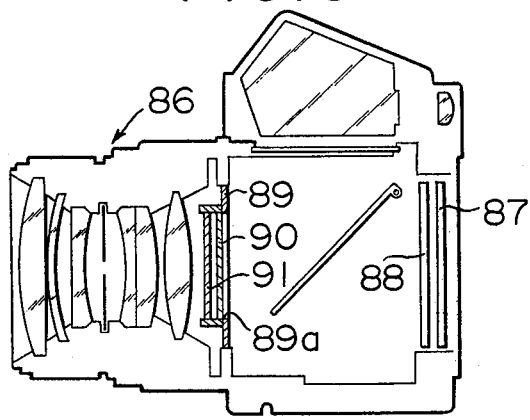
FIG. 8 is a schematic longitudinal sectional view of a photographic camera provided with a pair of polarization filters in accordance with the third embodiment of the present invention.

Referring to FIG. 8, in a camera body 86 of a single lens reflex camera in the back of which are located a film 87 and a focal plane shutter blind 88, is provided a fixed plate 89 having an aperture 89a behind the taking lens and in front of the swingable mirror. A fixed polarization filter 90 is mounted to the fixed plate 89 to cover the aperture 89a thereby. A rotatable polarization filter 91 is rotatably mounted on the fixed polarization filter 90. As shown in FIG. 9, an annular frome 90a of the fixed polarization filter 90 is fixed to the plate 89 and an annular frame 91a of the rotatable polarization filter 91 is concentrically and rotatably mounted around the annular frame 90a of the fixed filter 90. The frame 91a of the rotatable filter 91 is provided on the outer periphery thereof with an electromagnet coil 92. As shown in FIGS. 9 and 10, an arcuate permanent magnet 93 is fixed to the plate 89 by a pair of supports 94a and 94b and is slidably engaged with said electromagnet coil 92. The annular frame 91 is provided on the outer periphery thereof teeth 98 for controlling the rotation thereof. A stopper 99 having a stopper tip 99a is provided to operated by an electromagnet 100 to stop the rotation of the frame 91 by being brought into engagement with the teeth 98. When the electomagnet 100 is energized, the stopper 99 is pulled down in FIG. 9 and the stopper tip 99a is moved to a position to stop one of the teeth 98. The annular frame 91a of the rotatable filter 91 is further provided with a projection 95 connected with a tension spring 86. The projection 95 abuts on a stopper 97 fixed to the plate 89 being pulled by the tension spring 96 in the clockwise direction. Said electromagnetic coil 92 mounted to the frame 91a is energized to rotate the frame 91a counterclockwise and the tension spring 96 works to urge the frame 91a clockwise.

In operation of the above described third embodiment of the present invention, the electromagnetic coil 92 is energized immediately before the shutter is released. By the energization of the electromagnetic coil 92, the rotatable filter 91 is rotated counterclockwise overcoming the tension of the spring 96. On the way of the counterclockwise rotation of the rotatable filter 91, said electomagnet 100 is energized to pull the stopper 99 and stops the rotation of the filter 91. It will be understood by those skilled in the art that, by setting the pair of polarization filters 90 and 91 in the same relationship as that employed in the first embodiment and by controlling the electromagnetic coil 92 and the electromagnet 100 in the same way as that employed in the first embodiment to control said two electromagnets 23 and 32, the variable filter comprising the polarization filters 90 and 91 can be controlled to obtain the optimum exposure in accordance with the scene brightness.

I claim:

1. A photographic camera wherein the aperture size of a diaphragm and the shutter speed are freely selectable and the density of a filter is automatically controlled in accordance with the scene brightness comprising in combination:

a diaphragm the aperture size of which is freely selectable by manual operation, a shutter the exposure time of which is freely selectable by manual operation, a light measuring circuit which measures the scene brightness and gives an output corresponding to the measured scene brightness taking the selected aperture size and the selected shutter speed into account, a density-variable filter located on the optical axis of a taking lens of the camera the density or light transmittivity of which is variable, a filter operating means for varying said density of the density-variable filter, an electromagnetic starting means for starting operation of said filter operating means, an electromagnetic stopping means for stopping operation of said filter operating means, and an electromagnet controlling circuit which controls the time interval between the operation of said electromagnetic starting means and the operation of said electromagnetic stopping means, said light measuring circuit being connected with said electromagnet controlling circuit for controlling said time interval in accordance with said output of the light measuring circuit.

2. A photographic camera as claimed in claim 1 wherein said density-variable filter comprises a pair of superposed polarization filters one of which is rotatable with respect to the other.

3. A photographic camera as claimed in claim 2 wherein one of said pair of polarization filters is fixed in the camera and the other of said pair of polarization filters is rotatably mounted in the camera, and said filter operating means is connected with the rotatable polarization filter to rotate the same.

4. A photographic camera as claimed in claim 1 wherein said filter operating means comprises a movable member which varies the density of the filter by the movement thereof, and a driving means for moving said movable member.

5. A photographic camera as claimed in claim 4 wherein said driving means is a spring which is charged by an operation to wind up the film in the camera.

6. A photographic camera as claimed in claim 4 wherein said driving means is an electromagnetic driving means comprising a permanent magnet and an electromagnetic coil slidably engaged therewith, one of said permanent magnet and said coil being fixed or connected with said movable member so that the energization of said electromagnetic coil may move said movable member.

7. A photographic camera as claimed in claim 4 wherein said driving means is an electric motor, the shaft of the motor being fixed or connected with said movable member.

8. A photographic camera as claimed in claim 7 wherein the start and stop of the motor are conducted by said electromagnetic starting means and said electromagnetic stopping means, respectively.

* * * * *